United States Patent [19]
Botka

[11] 3,732,490
[45] May 8, 1973

[54] IMPEDANCE PROBE FOR SWEPT NETWORK ANALYZER SYSTEM

[75] Inventor: Julius K. Botka, Palo Alto, Calif.

[73] Assignee: Hewlett-Packard Company, Palo Alto, Calif.

[22] Filed: June 7, 1971

[21] Appl. No.: 150,702

[52] U.S. Cl. ................................324/57 R, 324/127
[51] Int. Cl. .............................................G01r 27/00
[58] Field of Search ..................324/57 R, 72.5, 127, 324/141, 142

[56] References Cited

UNITED STATES PATENTS

| | | | |
|---|---|---|---|
| 2,282,396 | 5/1942 | Cravath | 324/142 X |
| 1,707,773 | 4/1929 | Sarfert | 324/142 X |
| 3,068,411 | 12/1962 | Galman | 324/142 |
| 2,915,706 | 12/1959 | Zwicker et al. | 324/127 X |
| 3,283,242 | 11/1966 | Oliver | 324/57 R |
| 3,431,487 | 3/1969 | Savage | 324/127 X |
| 3,510,761 | 5/1970 | Brown | 324/57 R X |

FOREIGN PATENTS OR APPLICATIONS

| | | | |
|---|---|---|---|
| 696,511 | 9/1953 | Great Britain | 324/141 |
| 1,116,680 | 6/1968 | Great Britain | 324/142 |

*Primary Examiner*—Stanley T. Krawczewicz
*Attorney*—Roland I. Griffin

[57] ABSTRACT

A probe for use with a network analyzer for measuring the impedance and phase of a network or component under test over a wide swept frequency band comprising three transformers; a driver transformer for supplying power to a current loop including the test terminals connected across the device under test, a current measurement transformer in the current loop for measuring the current supplied from the driver transformer to the device under test, and a voltage measurement transformer coupled across the test terminals for measuring the voltage across the device. An adjustable balancing circuit including an additional winding on the driver transformer is utilized for balancing out the effect of parasitic capacitance across the test terminals. A small coupling circuit is provided between the current loop and the voltage measurement channel to compensate for the slight voltage drop in series with the device under test due to the probe tip socket and also for undesired leakage between the driver, current, and voltage measurement circuits of the probe structure. An annular grounding ring utilized on the measurement end of the probe is included in the current measurement circuit and the voltage measurement circuit, equal portions of the ring being included in each of said two circuits as measured from the null or midpoint of the grounding ring.

13 Claims, 4 Drawing Figures

IMPEDANCE PROBE FOR SWEPT NETWORK ANALYZER SYSTEM

BACKGROUND OF THE INVENTION

Network analyzers are currently utilized to make swept measurements of electronic components and networks over large frequency and dynamic ranges, displaying both magnitude and phase information simultaneously. For example, the Model 8407A Network Analyzer manufactured by Hewlett-Packard Company of Palo Alto, Calf., when used in conjunction with a suitable generator sweeper circuit, will provide simultaneous amplitude and phase information over a dynamic range of 100 db from 0.1 to 110 MHz with a phase reading from ±180°. One input to the analyzer serves as a reference signal fed to a reference channel in the instrument while a second signal, the measurement signal, is transmitted to the test channel of the analyzer. The analyzer then functions to compare the reference and measurement signal in both amplitude and phase.

The use of this network analyzer for impedance measuring is described in Application Note 121-2 published by Hewlett-Packard Company in June, 1970. By utilizing a current probe to measure the current (I) through the device under test and transmitting said current to the reference channel of the analyzer, and by measuring the voltage (V) across the device under test by a voltage probe and transmitting this voltage signal to the test channel of the analyzer, the analyzer will perform the function of determining the ratio between the two input signals, producing a display output which is a function of the impedance of the device under test in accordance with the relationship, $\hat{Z} = \hat{V}/\hat{I}$. The phase between the two input signals is simultaneously displayed over the range ±180°.

In order to optimize the impedance measurements, it is desired that the voltage probe be connected directly across the device under test so that the voltage reading is in fact only the voltage appearing across the device. The T junction necessary to provide the voltage probe connection to the measuring circuit has a parasitic capacitance associated therewith which, although of little consequence in measuring low resistance loads, for example, 50 ohms, has a substantial effect when measuring higher impedance values such as 10 kΩ, since the parasitic capacitance places several pF in parallel with the device under test. Therefore the resolution suffers greatly with this form of voltage probe located at the test terminal.

To overcome the effect of this parallel parasitic capacitance, the voltage probe T is removed to the opposite side of the current measurement circuit from the test terminals, and the elimination of the parallel capacitance substantially improves the measurement of high impedance devices. However, the voltage probe no longer measures the voltage directly across the device under test, but includes in the measurement the voltage drop across the portion of the current measuring channel incorporated in the circuit between the voltage probe and the test device. Although this circuit may comprise only a single turn of a transformer, an inductance of about 4μH measured at 1 kHz is thereby added to the circuit under measurement and, at high frequencies, it can amount to a fairly substantial resistance in series with the device under test even though the inductance is down to about 15 nH at 100 MHz due to core losses. For example, at 100 MHz, 10 ohms is added to the measurement and, although the operator could take this error into account in his final determination of impedance, it is inconvenient.

Although the 8407A Network Analyzer is designed to provide a 100 db dynamic range, the dynamic range obtainable with this form of probe is only about 40 db at the high frequency end and then only if great care is taken in the connection to and measurement of the device under test.

In addition, the voltage measurement channel of this prior probe utilizes an active amplifier section and thus the cost of the impedance probe is significantly increased.

Another form of impedance probe device is described in U. S. Pat. No. 3,283,242 issued Nov. 1, 1966 to B. M. Oliver, this probe being utilized in a system wherein the current measurement of the current through the device under test is utilized to control the generator so that the current remains constant, the measurement of the voltage across the device under test then serving as a measurement of the impedance of the device.

SUMMARY OF THE INVENTION

The present invention provides a novel impedance probe comprising passive circuit components and designed to perform fast, accurate measurements of the impedance of components, filters, networks, etc. wherein the parasitic impedances are lessened to the point where an 80–100 db dynamic measurement range is obtained from the network analyzer over substantially the entire swept frequency range from 100 kHz to 110 MHz. The impedance magnitude may be determined typically with 5 percent accuracy, and a phase may be determined typically within 5°.

The probe circuit includes three transformers, one transformer being coupled to the sweeper generator to provide driving current for the device under test. A second transformer is utilized in the reference or current measurement channel to measure the current passing through the device under test from the driver transformer. The third transformer serves as the test or voltage measurement transformer coupled across the measurement terminals of the probe where contact is made with the device under test; the primary of the voltage measurement transformer is connected directly across the test terminals so that the voltage measured is that across the device under test. The probe circuit is completely passive and thus eliminates the need for power to drive active amplifiers or the like.

A balancing circuit is provided for adjustably balancing out the effect of the parasitic capacitance present across the test terminals of the device under test. This balance circuit comprises a second secondary winding on the driver transformer and a variable capacitor connected in series with this winding to provide a current through the reference measurement channel of the probe to balance out the current drawn through the parasitic capacitance during the test, and thus, in effect, restoring the voltage across the test terminals.

A small coupling circuit is provided to couple the reference or current measurement circuit to the test or voltage measurement circuit to compensate for the small voltage drop occurring in a common portion of the two circuits associated with the probe socket into which the probe tip is screwed. In addition, this coupling circuit is used to compensate for any voltage picked up in the voltage measurement channel through leakage from the current driver transformer and current measurement channels of the probe structure since, although great care is taken in the probe construction to shield the driver, reference, and test channel circuits from each other, a small leakage occurs near the outer end of the probe where the shielding structure must terminate slightly short of a small segment of the probe network circuitry.

In order to accommodate the new probe structure to an existing calibration standard and adaptors, the probe is provided with an annular grounding ring near the measurement tip thereof. This grounding ring is split and is incorporated as a portion of the reference and test measurement channels to thereby reduce the common circuit paths in series with the device under test to a minimum. With the center of the grounding ring at a null point opposite the split, separate halves of the ring are included in the measurement and reference channel circuits, respectively. Contact with the grounding ring as one of the test terminals at other than the exact center or null point results in the inclusion of a portion of the ring in one or the other of the two reference or test channels but, for measurement purposes, the measurements under 10 $\Omega$ are effected very little.

The probe structure is rugged with a relatively few number of passive circuit elements making up the driver, reference and test measurement channels, each mounted in a section or compartment within the probe substantially shielded from the other electrical channels of the probe circuitry.

In another embodiment of the novel probe structure, the measured current is fed to the test channel of the network analyzer and the voltage measured across the unknown is fed into the reference channel, and the network analyzer produces an admittance reading display, the inverse of impedance, as well as phase. In this case, the transformer turns ratios are chosen differently, and the balancing circuit providing external inductance adjustment extends between the driver transformer and the voltage measurement transformer.

DESCRIPTION OF THE PREFERRED EMBODIMENTS

Figure 1:
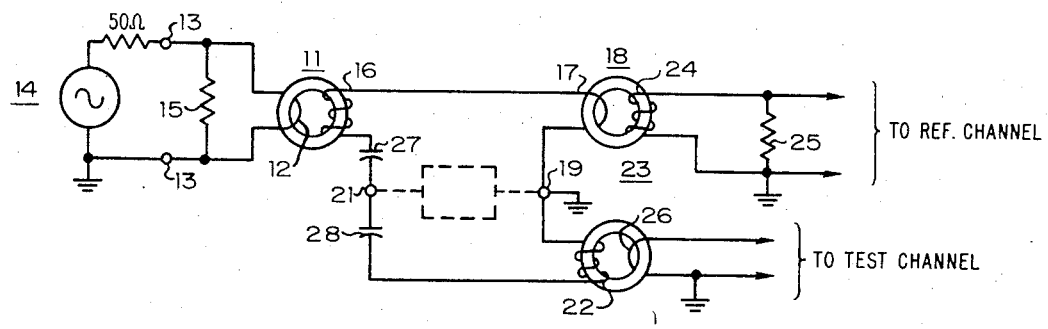
FIG. 1 is a schematic diagram of a preferred embodiment of the novel probe circuit.

Referring now to FIG. 1 the novel probe circuit comprises a toroidal driver transformer 11 having its single turn primary winding 12 coupled to the input 13 from a sweeper generator circuit 14 such as a Model 8601A Sweeper manufactured by Hewlett-Packard Company, which delivers an input signal swept between 0.1 – 110 MHz. The sweeper circuit has a 50 ohm internal impedance, and a 50 ohm resistor 15 across the primary winding 12 of the driver transformer serves as a broadband termination for the sweeper. The secondary 16 of the driver transformer, which is floating off ground, is connected in series with the single turn primary winding 17 of a toroidal current or reference channel transformer 18, one terminal of which is connected to one terminal 19 of the device test terminals, the other test terminal 21 being coupled to the opposite side of the secondary 16 of the driver transformer. The primary winding 22 of a third toroidal transformer 23 in the test or voltage measurement channel is coupled across the two test terminals 19, 21. The secondary winding 24 of the current channel transformer 18 in parallel with the 100 $\Omega$ resistor 25 is coupled to the reference channel input of the network analyzer circuit while the single turn secondary winding 26 of the voltage channel transformer 23 is coupled to the voltage or test channel input of the analyzer.

A pair of capacitors 27, 28 are included in series with the secondary winding 16 of the driver transformer and the primary winding 22 of the test channel transformer, respectively, to insure that a DC short does not appear across the device under test. The capacitance of these two capacitors is relatively large so that they produce a minimal effect on the probe circuit measurements.

The core material for the three toroids is material 3E3 from Ferroxcube Corp., a high permeability material at low frequencies, for example, a $\mu$ of 14,000. The lossy characteristic of this material is good for the present application because it results in a flat response over the wide frequency band of operation of the circuit. The primary windings 12, 17 for the driver transformer and the current transformer as well as the secondary winding 26 for the voltage transformer are No. 28 wire, the four turn secondary winding 16 of the driver transformer and the three turn secondary winding 24 of the current transformer being No. 34 wire while the 40 turn primary winding 22 of the voltage transformer is No. 40 wire. The four turn secondary winding 16 of the driver transformer converts the 25 ohm input to an impedance of about 150 ohms which thus serves to limit the current in the loop through the device under test to maintain a current in the reference channel within the optimum current range for the reference channel circuit of the network analyzer.

The current passing through the loop comprising the secondary 16 of the driver transformer and the single turn winding 17 of the current transformer and the device under test positioned across the two test terminals 19, 21 is measured by the reference channel transformer 18 and transmitted to the reference channel of the network analyzer. The voltage across the device under test produces a small current proportional thereto through the 40 turn primary winding 22 of the voltage transformer, thus producing a signal dependent thereon in the test channel of the network analyzer. From these two current and voltage measurements, the network analyzer operates to produce an output dependent on the ratio thereof and thus a reading proportional to the impedance of the device under test.

A single turn is utilized as the primary winding 17 of the reference channel transformer to eliminate any bypass currents from flowing through the capacitance which would exist between multiturns to thus maintain an accurate current measurement in the reference channel. The multiturn primary winding 22 of the test channel converts the 50 ohm impedance of the test channel circuit up to a significantly higher impedance, e.g., 10 k$\Omega$, across the device under test so that this parallel impedance will have a minimum affect on the current through the test device.

It can be seen that this probe network utilizes only passive circuit elements and thus a minimum amount of power is consumed in operation. In addition, the primary 22 of the voltage measurement transformer is connected directly across the test terminals 19, 21 so that the measured voltage is that present across the device under test and does not include portions of the current measurement circuit. These various transformers also provide proper impedance matching levels to the test and reference channels of the network analyzer, thus optimizing channel output matching.

Figure 2:
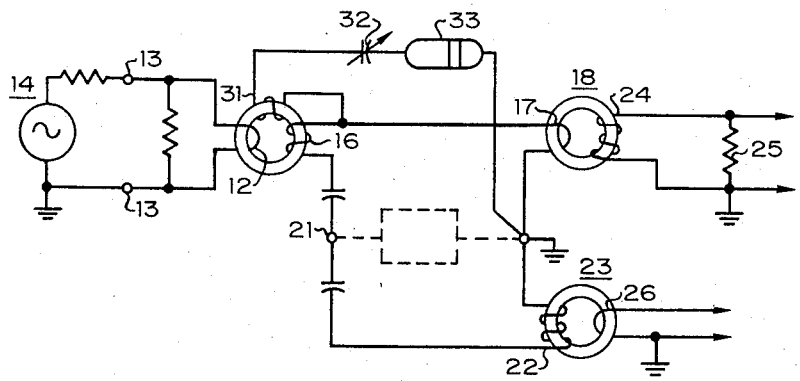
FIG. 2 is a schematic diagram of the novel probe circuit of FIG. 1 modified to include the novel balancing circuit utilized to balance out the effect of parasitic capacitance across the measurement terminals.

With this novel probe network as with others, a parasitic capacitance exists across the test terminals 19, 21 and in parallel with the device under test. Although in many measurements this parasitic capacitance may be ignored, the balancing circuit shown in FIG. 2 may be incorporated for the purpose of compensating for the current drawn by the parasitic capacitance. This balancing circuit comprises a second secondary coil 31 wound on the driver transformer 11 and a variable capacitor 32 and delay line 33 connected in series with this secondary winding 31 and across the primary winding 17 of the reference channel transformer 18. The delay line 33 may be omitted but it helps to optimize the operation of the circuit. The current induced in this secondary winding 31 of the driver transformer passes around the loop comprising the secondary winding 31, the variable capacitor 32, delay line 33 and the primary winding 17 of the reference channel transformer in opposition to the current flowing through the loop comprising the primary winding 17 of the reference channel transformer, the device under test across terminals 19, 21, and the secondary winding 16 of the driver transformer. The capacitor 32 is adjustable to control the balancing current so that it just balances out the current drawn by the parasitic capacitance across the device under test. This has the effect of restoring the voltage across the device under test to the value that it would have absent the existence of the undesired parasitic capacitance.

Figure 3:
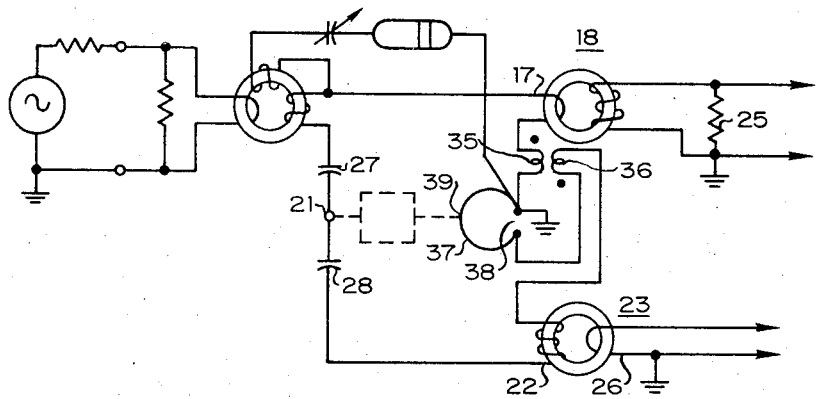
FIG. 3 is a schematic diagram of still another embodiment of the present invention similar to that of FIG. 2 but including a novel coupling circuit for compensating for probe socket voltage drops and leakage from the driver and current measurement channels to the voltage measurement channel as well as the inclusion of the split grounding ring of the probe.

In the modification shown in FIG. 3, a novel coupling circuit comprising a coupling transformer having its primary winding 35 in series with the primary 17 of the reference channel transformer 18 and its secondary winding 36 in series with the primary winding 22 of the test channel transformer is provided. This coupling circuit is utilized to compensate for a very small voltage drop occurring in series with the device under test due to the small probe socket in the end of the probe, the probe socket in effect consisting of a small impedance in each of the two circuits leading to the high test terminal 21 from the primary 22 of the test channel transformer and the secondary 16 of the driver transformer. In addition to providing the small compensating voltage, the coupling circuit is also utilized to compensate for any voltage pick up in the test channel through leakage and radiation from the current measurement circuit and the generator circuit, this leakage occurring since, although the individual circuits are mounted in separate shielded compartments in the probe, the shielding must terminate near the measurement end of the probe and leakage can occur where shielding terminates.

In order to adapt the probe of the present invention to the existing calibration standard and adaptors now utilized with the HP 8407A Network Analyzer, it was desirable that an annular grounding ring be provided at the measurement end of the probe. In this novel probe structure, the grounding ring 37 is provided with a slit 38 to interrupt the closed circuit path around the grounding ring and the ring 37 is then incorporated into the circuit of the reference and test channels as shown in FIG. 3. With the midpoint 39 of the ring opposite the slit 38 serving as the ground terminal for the test device, the separate halves of the grounding ring are included in the test and measurement channel circuits, respectively. The optimum reading is obtained in the circuit test when the midpoint or null point of the grounding ring is utilized as the ground test terminal. If the test contact is made on either side of the null point 39 of the grounding ring, the major and minor portions of the grounding ring between the contact point and the two ends of the ring are incorporated in one or the other of the two channel circuits, respectively. Since the internal shielding wall between the current or reference channel section and the voltage or test channel section extends up into the ring in alignment with said null point 39 and slot 38, contact with the unknown made on one side of said null 39 results in inclusion of that port of said one side between the contact point and the null point 39 into the circuit of the other side of the shield. This results in an undesired coupling between the two channels, leading to small inductance displayed in series with the unknown of about 1 ohm at 110MHz with contact at the extreme ends of the ring. For readings down to 0.1 ohm, contact should be made at the null point 39.

Figure 4:
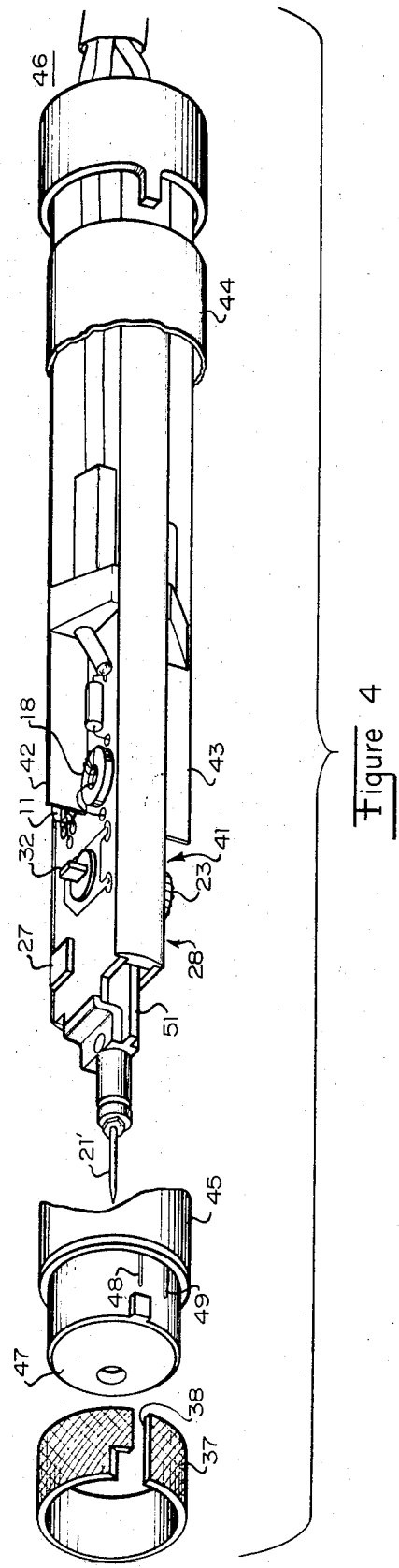
FIG. 4 is a perspective view partly exploded and cutaway showing the novel probe structure of the present invention.

Referring now to FIG. 4 there is shown one form of construction for the novel probe comprising a base portion 41 separated into individual circuit compartments by shielding walls 42, 43, the entire base assembly being enclosed by a cylindrical shield 44 which in turn is enclosed by a cylindrical probe casing 45. The driver, current and voltage channels of the probe, including the three associated toroidal transformers, are each mounted in separate ones of the shielded compartments of the base assembly, the external connections with these three channels being made via cables 46. The balancing capacitor 32 mounted on the base assembly may be adjusted by turning a screw reaching it via an access hole in the cover 45. The two capacitors 27, 28 leading to the test terminal 21, i.e. probe tip 21', are shown.

The probe tip 21' extends through the insulator 47 in the outer end of the probe. The split grounding ring 37 is positioned over the insulated end of the probe and makes contact with the internal circuit via the two contact terminals 48, 49. The slit 38 in the grounding ring is aligned with the shielding wall 51 positioned between the test and reference circuit sections of the probe structure.

It should be noted that by transmitting the output from transformer 18 to the test channel of the analyzer and the output from transformer 23 to the reference channel of the analyzer, the readout of the analyzer will be the admittance of the device under test, i.e. the inverse of the impedance. For optimum admittance readings, a change in the turns ratios of the transformers may be required. Also, the balancing circuit would be coupled in series with the primary winding of transformer 23 and would provide an external inductance balancing adjustment.

I claim:

1. An impedance measuring circuit comprising a current measurement channel including a first transformer having a primary winding and a secondary winding, a voltage measurement channel including a second transformer having a primary winding and a secondary winding, a pair of test terminals for coupling across the device under test, a third transformer having a primary winding adapted for connection to an AC power source and a secondary winding connected in series with the primary winding of said first transformer and with said test terminals to deliver driving current to the device under test, the current in the secondary of said first transformer serving as a measure of said driving current, additional circuit means for coupling the primary winding of said second transformer across said test terminals, the current induced in the secondary winding of said second transformer serving as a measure of the voltage across the device under test, and a current balancing circuit including a capacitor coupled in shunt across the primary winding of said first transformer to bypass from the current flow therein the current flow due to a parasitic capacitance path across said test terminals.

2. An impedance measuring circuit as claimed in claim 1 wherein said secondary winding on said third transformer comprises a plurality of turns to increase the impedance of the driving current circuit above the impedance of said power source.

3. An impedance measuring circuit as claimed in claim 2 wherein said current balancing circuit also includes an additional secondary winding on said third transformer connected in series with said capacitor.

4. An impedance measuring circuit as claimed in claim 3 wherein said current balancing circuit includes a delay line connected in series with said additional secondary winding and said capacitor.

5. An impedance measuring circuit comprising a current measurement channel including a first transformer having a primary winding and a secondary winding, a voltage measurement channel including a second transformer having a primary winding and a secondary winding, a pair of test terminals for coupling across the device under test, a third transformer having a primary winding adapted for connection to an AC power source and a secondary winding connected in series with the primary winding of said first transformer and with said test terminals to deliver driving current to the device under test, the current in the secondary of said first transformer serving as a measure of said driving current, additional circuit means for coupling the primary winding of said second transformer across said test terminals, the current induced in the secondary winding of said second transformer serving as a measure of the voltage across the device under test, and a coupling transformer having a first winding in series with the primary winding of said first transformer and a secondary winding in series with the primary winding of said second transformer.

6. An impedance measuring circuit comprising a current measurement channel including a first transformer having a primary winding and a secondary winding, a voltage measurement channel including a second transformer having a primary winding and a secondary winding, a source of AC current, a pair of test terminals for coupling across the device under test, a third transformer having a primary winding adapted for connection to an AC power source and a secondary winding connected in series with the primary winding of said first transformer and with said test terminals to deliver driving current to the device under test, the current in the secondary of said first transformer serving as a measure of said driving current, additional circuit means for coupling the primary winding of said second transformer across said test terminals, the current induced in the secondary winding of said second transformer serving as a measure of the voltage across the device under test, and an annular-shaped, split grounding ring coupled in series between the primary winding of said first transformer and the primary winding of said second transformer, said grounding ring serving as one of said test terminals.

7. An impedance measuring circuit as claimed in claim 6 comprising a current measurement channel including a first transformer having a primary winding and a secondary winding, a voltage measurement channel including a second transformer having a primary winding and a secondary winding, a source of AC current, a pair of test terminals for coupling across the device under test, circuit means for coupling the primary winding of said first transformer in series with said AC current source and said test terminals to deliver driving current to the device under test, the current in the secondary of said first transformer serving as a measure of said driving current, additional circuit means for coupling the primary winding of said second transformer across said test terminals, the current induced in the secondary winding of said second transformer serving as a measure of the voltage across the device under test, and a coupling transformer having a first winding in series with the primary winding of said first transformer and a secondary winding in series with the primary winding of said second transformer.

8. An impedance measuring circuit as claimed in claim 7 including an annular-shaped, split grounding ring coupled in series between the primary winding of said first transformer and the primary winding of said second transformer, said grounding ring serving as one of said test terminals.

9. An impedance measuring circuit as claimed in claim 8 comprising a current measurement channel including a first transformer having a primary winding and a secondary winding, a voltage measurement channel including a second transformer having a primary winding and a secondary winding, a source of AC current, a pair of test terminals for coupling across the device under test, circuit means for coupling the primary winding of said first transformer in series with said AC current source and said test terminals to deliver driving current to the device under test, the current in the secondary of said first transformer serving as a measure of said driving current, additional circuit means for coupling the primary winding of said second transformer across said test terminals, the current induced in the secondary winding of said second transformer serving as a measure of the voltage across the device under test, and an annular-shaped, split grounding ring coupled in series between the primary winding of said first transformer and the primary winding of said second transformer, said grounding ring serving as one of said test terminals.

10. An impedance measuring circuit as claimed in claim 9 wherein said source of AC current comprises a third transformer having a primary winding adapted for connection to an AC power source and a secondary winding connected in series with the primary winding of said first transformer and with said test terminals.

11. An impedance measuring circuit as claimed in claim 10 comprising a current balancing circuit including a capacitor coupled in shunt across the primary winding of said first transformer to bypass from the current flow therein the current flow due to a parasitic capacitance path across said test terminals.

12. An impedance measuring circuit as claimed in claim 11 wherein said current balancing circuit also includes an additional secondary winding on said third transformer connected in series with said capacitor.

13. An impedance measuring circuit as claimed in claim 12 wherein said current balancing circuit includes a delay line connected in series with said additional secondary winding and said capacitor.

* * * * *